United States Patent [19]

Natu

[11] Patent Number: 5,790,850
[45] Date of Patent: Aug. 4, 1998

[54] FAULT RESILIENT BOOTING FOR MULTIPROCESSOR COMPUTER SYSTEMS

[75] Inventor: Mahesh Natu, Beaverton, Oreg.

[73] Assignee: Intel Corporation, Santa Clara, Calif.

[21] Appl. No.: 723,909

[22] Filed: Sep. 30, 1996

[51] Int. Cl.$^6$ .................................................. G06F 9/06
[52] U.S. Cl. ............................... 395/652; 395/200.52
[58] Field of Search ............................ 395/651, 652, 395/653, 200.5, 200.51, 200.52

[56] References Cited

U.S. PATENT DOCUMENTS 5,450,576  9/1995  Kennedy ................................. 395/652

OTHER PUBLICATIONS

"Pentium® Pro Processor BIOS Writer's Guide," Version 2.0, Intel Corporation, Jan., 1996, Chapter 4.

Primary Examiner—Kevin A. Kriess
Attorney, Agent, or Firm—Kenyon & Kenyon

[57] ABSTRACT

A multiprocessor computer system determines that the hard reset designated BSP has failed by examining its status bits. The designated BSP then selects a processor from among the APs that will take the place of the designated BSP. The selection is accomplished by, successively for every AP indicated to be good by examining its corresponding status flag, determining whether the AP is present, starting up the AP if it is present, determining whether the AP has passed its BIST, and selecting the AP to take the place of the designated BSP if the AP has passed its BIST. The BSP then designates the selected AP as the BSP instead of itself. The bootstrap indicator bit of the selected AP is set to indicate that the AP is the BSP. The bootstrap indicator bit of the designated BSP is cleared. The computer system then undergoes a soft reset which causes the selected AP to become the BSP and begin running the BIOS code from the reset vector.

16 Claims, 3 Drawing Sheets

FAULT RESILIENT BOOTING FOR MULTIPROCESSOR COMPUTER SYSTEMS

BACKGROUND OF THE INVENTION

The present invention is directed to a method and apparatus for booting or initializing a multiprocessor computer system. More particularly, the present invention is directed to a method and apparatus for booting a multiprocessor system when the designated bootstrap processor fails.

A typical multiprocessor computer system utilizes a plurality of central processing units (CPUs) connected together to increase total processing power and provide redundancy in case one CPU fails. One such multiprocessor computer system is composed of multiple Pentium® Pro processors from Intel Corporation attached to a common bus. A typical multiprocessor computer system utilizing Pentium® Pro processors is shown in FIG. 1.

In FIG. 1, four Pentium® Pro processors 10–13 are connected to an Advanced Programmable Interrupt Controller (APIC) bus 19 and a processor bus 20. Information about the Pentium® Pro processors is available in the Pentium Pro Family Developer's Manual, Vols. 1–3, from Intel Corporation (Intel order nos. 292690–692, respectively), herein incorporated by reference. Each respective processor 10–13 includes an integrated local APIC 14–17. Each local APIC 14–17 controls dispatching of interrupts to its corresponding processor and provides functions such as queuing, nesting and masking of interrupts. Further, each local APIC 14–17 can provide interprocessor interrupts and interprocessor messaging. The local APICs 14–17 include various registers (not shown) that store information. One such register is the APIC ID register which stores the physical ID of the processor. Another register is the APIC base register.

Attached to the processor bus 20 is a memory controller 36 and a bus controller 24. The memory controller 36 connects memory 38 such as Dynamic Random Access Memory (DRAM) to the processor bus 20 so that the memory 38 can be used by any processor 10–13. The bus controller 24 connects a Peripheral Component Interconnect (PCI) standard bus 26 to the APIC bus 20. An input/output (I/O) APIC 28 is attached to the PCI bus 26. The I/O APIC 28 is responsible for capturing interrupts sent by I/O devices, and distributing them among local APICs 14–17 via the APIC bus 20. Peripheral PCI compatible devices (not shown) such as a SCSI host bus adapter, a LAN adapter, a graphics adapter, etc. can be also be attached to the PCI bus 26.

Further, an I/O bus 30 is attached to the PCI bus 26. The I/O bus 30 can be any industry standard bus such as, for example, an Industry Standard Architecture (ISA) bus, or an extended ISA (EISA) bus. Attached to the I/O bus 30 is a Basic Input Output System (BIOS) Read Only Memory (ROM) 32. The BIOS ROM 32 includes software code that initializes and tests system components before an operating system is loaded. A Complementary Metal-Oxide-Semiconductor (CMOS) RAM 34 or flash memory is also attached to the I/O bus 30. The CMOS RAM 34 maintains storage without power and can be used to store information about each processor 10–13, including a status flag and a presence flag.

Each processor 10–13 automatically performs a Built-in Self Test (BIST) when power is initially applied to it. The BIST tests the hardware and microcode of the processor. The cumulative result of all tests are stored in the EAX register which is a register in the processor. If EAX contains zero, then all tests passed. Any non-zero result indicates a faulty.

When being initialized, a processor can read its EAX, or the result of the BIST, and store the results in the CMOS RAM 34 as a status flag. If a processor at any time fails a BIST, its corresponding status flag in CMOS RAM 34 will indicate the failure. The flag will continue to indicate failure even if subsequent BISTs pass for that processor. The CMOS RAM 34 must be reset to eliminate a failed status flag.

The Pentium® Pro processors 10–13 are reset two different ways. Power-up Reset, or hard reset, is when power is initially being applied to the processors. Upon a Power-up Reset, the local APIC obtains its physical ID and stores it into the APIC ID register. Initialization Reset (INIT) is a soft reset. An INIT resets all local APIC registers except the APIC base and APIC ID registers.

Chapter 4 of the Pentium® Pro Processor BIOS Writer's Guide, Version 2.0 (January, 1996, Intel order no. 649773-001) discloses a known method for initializing or booting a multiprocessor computer system such as the one shown in FIG. 1.

In this method, when the system undergoes a Power-up Reset the processors select a Bootstrap Processor (BSP) using a multiple processor (MP) initialization protocol. The MP protocol is an arbitration method that uses the message passing capabilities of the processors' local APICs to dynamically select a BSP based on the physical IDs of the local APICs 14–17. Therefore, the BSP is always chosen by the hardware, or the physical positioning of the processors. The BSP is responsible for initializing the system and for booting the operating system. The code used to initialize the system is stored in the BIOS ROM 32. The other processors are classified as application processors (AP) and are placed in a wait state. The wait state is a special state in which the processor is not executing, but its local APIC is listening to Inter-Processor Interrupt (IPI) messages on the APIC bus 19. The AP's are typically activated only after the operating system is up and running.

The BSP initially checks its BIST results in the EAX and stores the results in the CMOS RAM 34 as a status flag. The BSP then checks its status flag. If the status flag indicates failure the processor designated as the BSP is not currently functioning properly, or has not functioned properly in the past, and the booting procedure is ended. A processor that is known to have failed in the past is likely to fail again. Failure of a BSP may result in unpredictable behavior, system failure, data loss, etc. Therefore, an error message is transmitted to the user. The user must then shut the system down and physically replace the BSP with another processor. This significantly increases the time needed to initialize the multiprocessor system.

Based on the foregoing, there is a need for a method and apparatus for booting a multiprocessor system that does not require the BSP processor to be physically replaced when it has failed a BIST.

SUMMARY OF THE INVENTION

The method and apparatus of the present invention allows a multiprocessor computer system to initialize properly even when the processor that is designated as the BSP after a hard reset of the computer system fails. The present invention also prevents a processor that has failed previously from becoming the BSP.

In the present invention, the designated BSP determines it has failed after examining its corresponding status bits. The BSP is determined to have failed if its status bits reflect that it has failed during the current boot, or any previous boot. The designated BSP then selects a processor from among the APs that will take the place of the designated BSP. The selection is accomplished by, successively for every AP indicated to be good by examining its corresponding status flag, determining whether the AP is present, starting up the AP if it is present, determining whether the AP has passed its BIST, and selecting the AP to take the place of the designated BSP if the AP has passed its BIST. The BSP then designates the selected AP as the BSP instead of itself. The bootstrap indicator bit of the selected AP is set to indicate that the AP is the BSP. The bootstrap indicator bit of the designated BSP is cleared. The computer system then undergoes a soft reset which causes the selected AP to become the BSP and begin running the BIOS code from the reset vector.

DETAILED DESCRIPTION

The present invention takes advantage of a feature present in some processors that allows the designated BSP to be changed by setting a bootstrap bit and generating a software reset of the computer system. An example of a processor that has such a feature is the Pentium® Pro processor. Specifically, the APIC base register in the Pentium® Pro processors 10–13 shown in FIG. 1 includes a bootstrap indicator bit. When this bit is set to one, the corresponding processor is automatically chosen as the BSP after an INIT or soft reset. In contrast, with a power-up or hard reset, the BSP is chosen based on the physical positioning of the processors.

Figure 1:
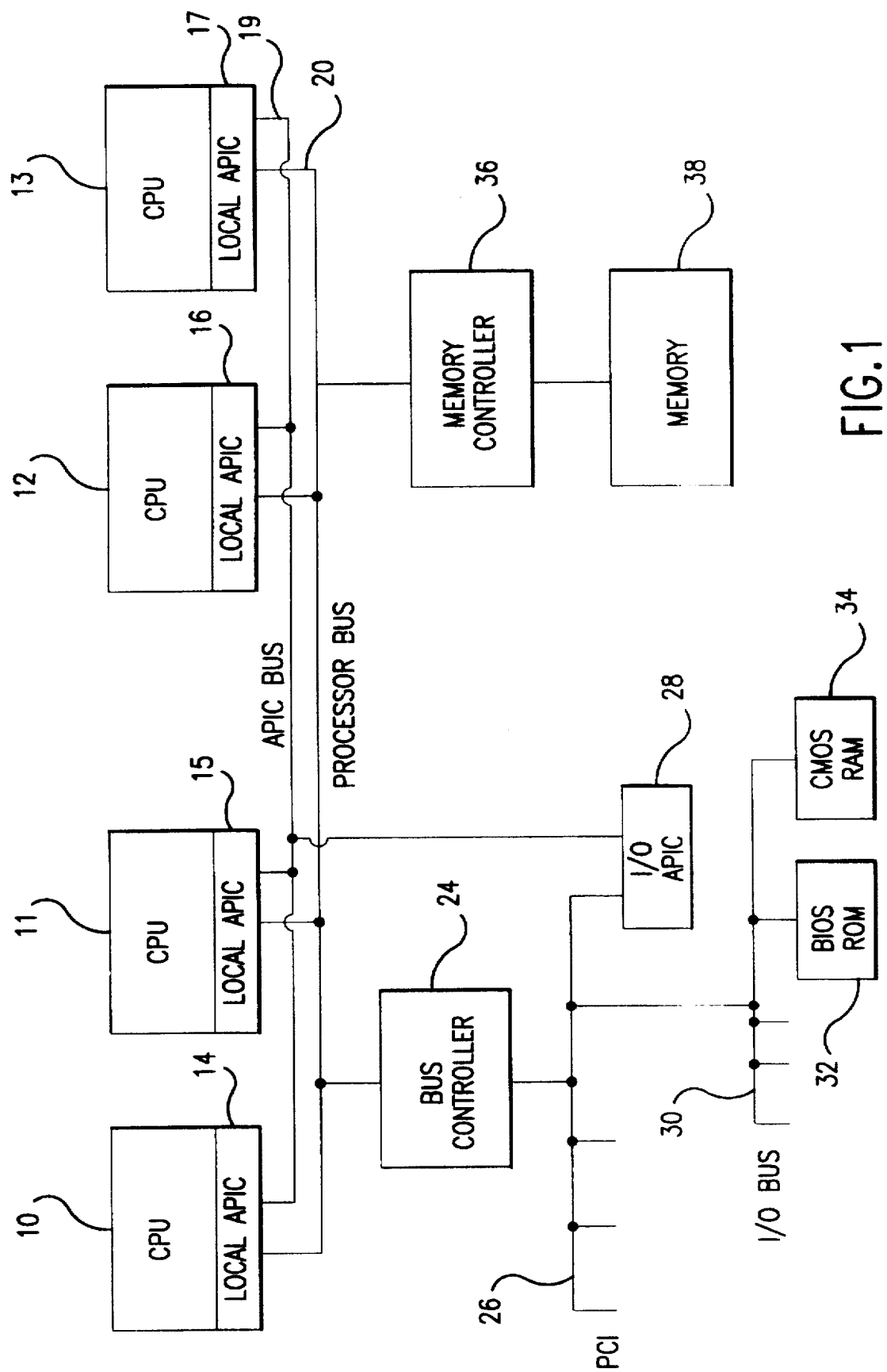
FIG. 1 is a block diagram of a multiprocessor computer system.
Figure 2A:
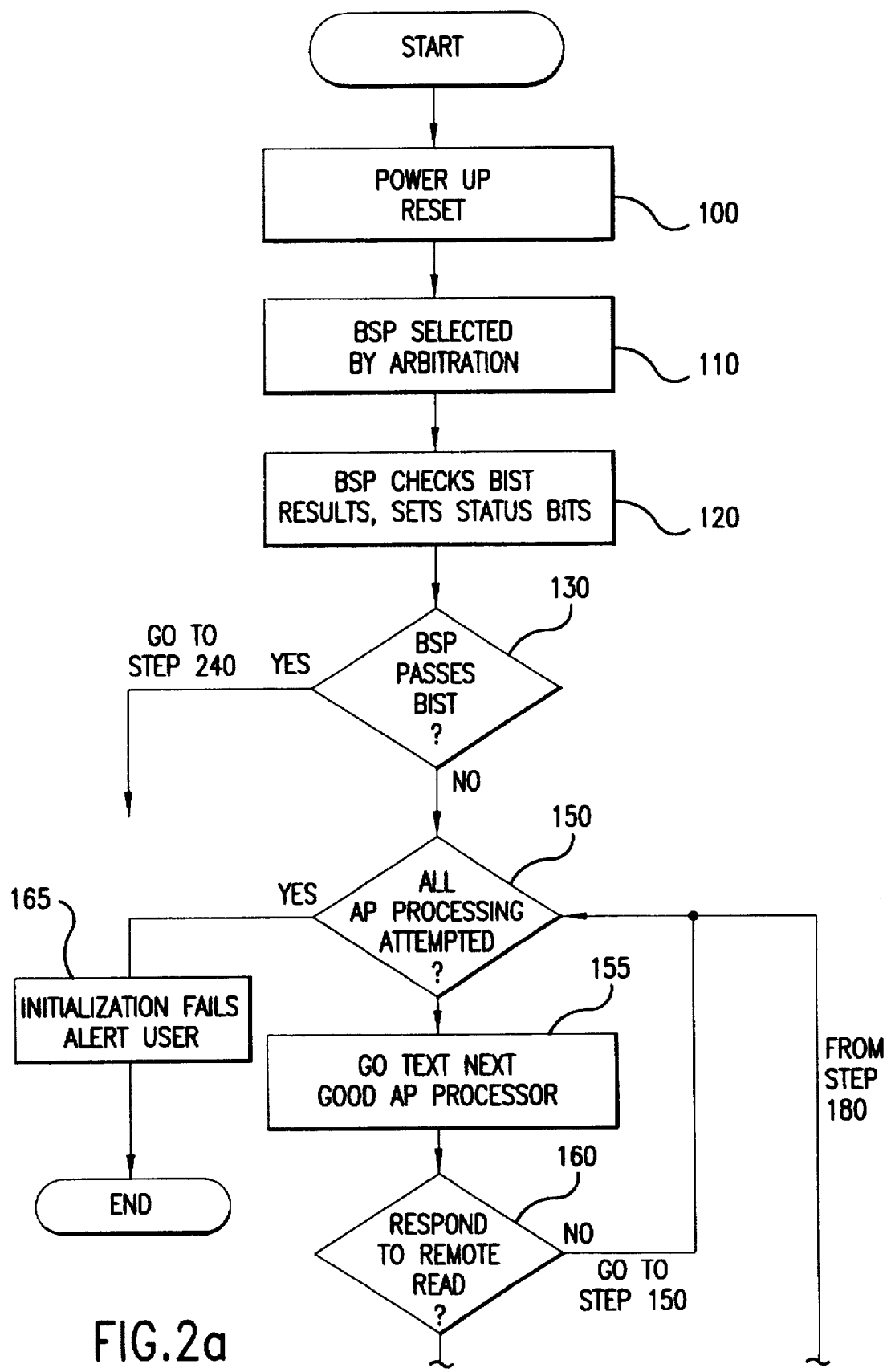
FIGS. 2a and 2b together form a flow diagram of the steps taken by the present invention to initialize a multiprocessor computer system.
Figure 2B:
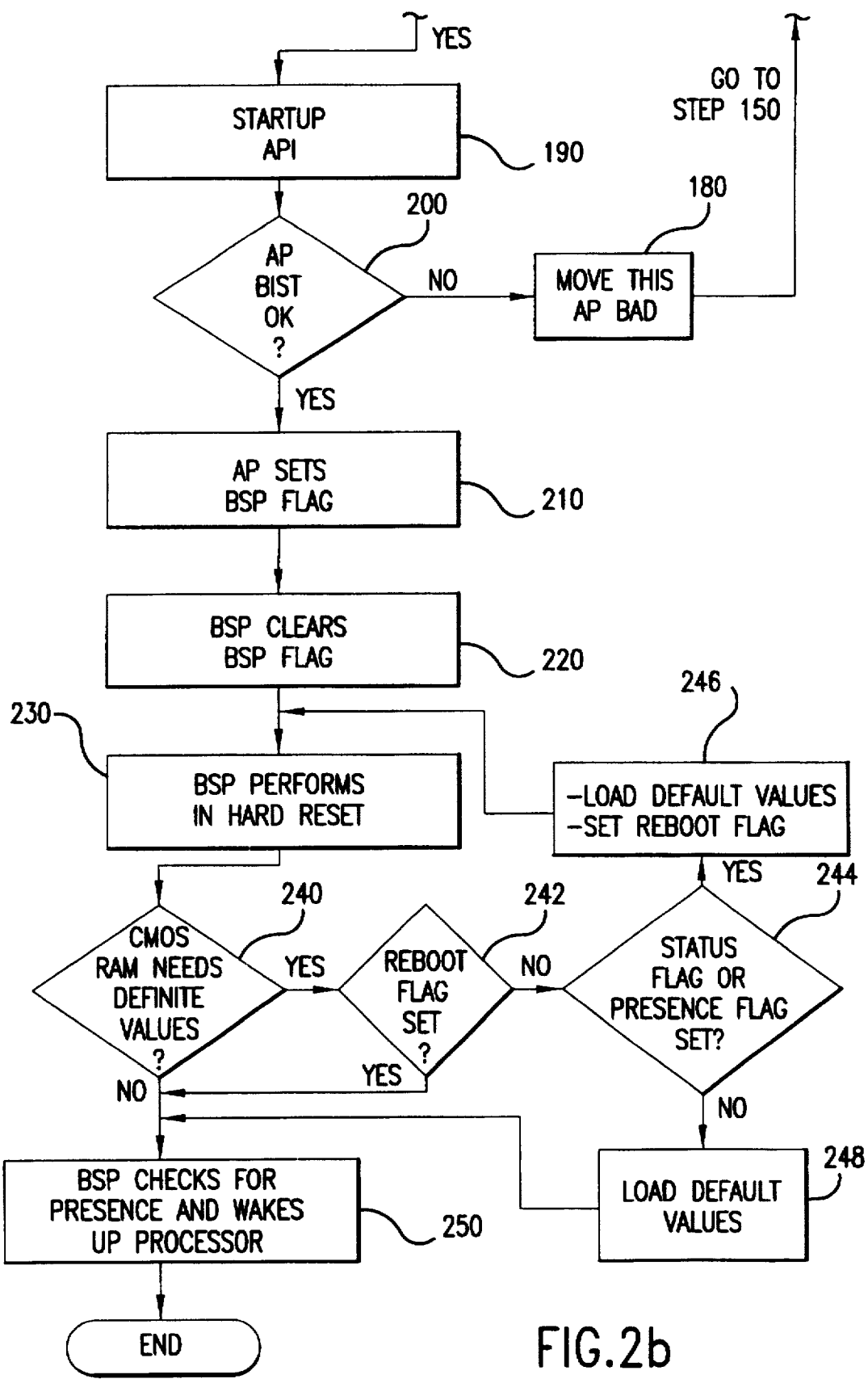

FIG. 2 provides a flowchart of the steps used by the present invention to initialize a multiprocessor system. The present invention is a multiprocessor system such as shown in FIG. 1, with the program for carrying out the steps of FIG. 2 stored in any computer readable media. In the preferred embodiment the program is stored in the BIOS ROM 32. The functionality of the program described herein can also be implemented in hardware if desired.

At step 100, the multiprocessor system shown in FIG. 1 is subject to a power-up or hard reset. At step 110, a BSP processor is selected using the known arbitration method which utilizes APIC IDs. After step 110 is completed, the selected BSP processor begins the power-on self-test (POST) by executing the BIOS code stored in BIOS ROM 32.

Initially, the BSP enables access to a non-volatile memory, which in the preferred embodiment is the CMOS RAM 34. Then, at step 120, the BSP reads its identification number from the APIC ID. The BSP then checks its BIST results in its EAX register and sets its status flag in the CMOS RAM 34 to fail if the results in the EAX are nonzero. The status flag is now up-to-date for the BSP processor.

At step 130 the BSP checks its status by reading its status flag in the CMOS RAM 34. If the BSP processor is good, the POST branches to step 240. If the BSP processor is bad or has failed the BIST, the POST goes to step 150 and attempts to reassign the BSP designation to another processor. A BSP is considered to have failed if the BIST has failed for that processor during the current boot, or any previous boot. Any BIST failure is reflected in the status flag.

Step 150 begins a loop in which the BSP will attempt to transfer the BSP designation to each AP until it is successful.

At step 150, the BSP determines whether it has attempted to transfer the BSP designation to all of the APs in the system. If it has, at step 165 the initialization has failed because no APs can function as the BSP. The appropriate message is displayed for the user.

If the BSP transfer has not been attempted for all of the APs at step 150, at step 155 the BSP goes to the next available AP that it determines is "good." The BSP determines at step 155 that the AP is good by reading its corresponding status flag in the CMOS RAM 34. If the status flag indicates a faulty processor, the BSP goes to the next processor.

At step 160 a remote read request IPI is sent to the good AP to check its presence. If a processor is present, it will respond with its APIC version. If it does respond with its APIC version, the POST goes to step 190. If there is no response to the remote read request IPI, or incorrect data is returned, the BSP determines if the presence flag in the CMOS RAM 34 is set for that processor. If the presence flag is set, the BSP updates the status flag in the CMOS RAM 34 for that processor and then returns to step 150.

At step 190 the BSP wakes up the good AP by sending a startup IPI. After startup, at step 200, the AP checks its BIST results in its EAX. If the BIST results is failure, it signals the BSP that it cannot become the new BSP, and the POST branches to step 180 where the processor is marked bad by having the BSP set the status flag for that AP processor in the CMOS RAM 34. The POST then returns to step 150.

When step 210 is reached, an AP has been determined to be able to function as the BSP. At step 210, the AP sets the bootstrap indicator bit in its APIC base register to "one" and indicates completion to the BSP. At step 220, the BSP clears its bootstrap indicator bit in its APIC base register.

At step 230, the BSP performs an INIT reset of the computer system. At this point, the AP becomes the "new" BSP and begins to execute the BIOS code from the reset vector.

At step 240, the CMOS RAM 34 is checked by the BSP to determine if it should be loaded with default values (due to a bad checksum, a user request to load default values, etc.). If default values should be loaded, the POST branches to step 242. At step 242, the BSP checks if the reboot flag is set in the CMOS RAM 34. The reboot flag indicates that the computer system should not loaded with default values and prevents an infinite, automatic reset loop of the computer system due to problems with the CMOS RAM 34. If the rebooting flag is set in step 242, the POST branches to step 250. Otherwise, the POST goes to step 244.

At step 244, the BSP determines whether any status flags or presence flags are set in the CMOS RAM 34. If no flags are set, the BSP loads default values in the CMOS RAM 34 at step 248 and the POST goes to step 250. If flags are set, the POST goes to step 246 where the BSP loads default values and sets the reboot flag. All of the status flags and presence flags are cleared when the default values are loaded. The POST then goes to step 230 which performs a hard reset on the computer system. Resetting is necessary because a processor may have been incorrectly marked as disabled due to bad data in the CMOS RAM 34.

At step 250, the selected BSP checks for the presence of each processor by sending a remote read IPI and updating the presence flags in the CMOS RAM 34. The BSP then wakes up all good APs, one by one, by sending a startup IPI. The APs initialize themselves. If an AP fails to initialize itself within a certain time, it is assumed to be bad and the BSP sets its corresponding status flag in the CMOS RAM 34. Error messages are displayed to notify the user of any bad processors. The POST is then completed and the designated BSP then loads the operating system.

What is claimed is:

1. A method of initializing a multiprocessor computer system comprising a plurality of processors and a non-volatile memory for storing a status flag corresponding to each processor, wherein each of the plurality of processors performs a built-in self test (BIST) when it is powered up, wherein a first processor is designated as a bootstrap processor (BSP) after a hard reset and the remaining processors are application processors (APs), and wherein upon doing a hard reset it is determined that said first processor has failed, comprising the steps of:

a) selecting a second processor from said remaining processors; and b) designating said second processor as said BSP instead of said first processor;

wherein said selecting step comprises the following steps, which are performed successively until said second processor is selected for each of said APs that are indicated to be good by their corresponding status flag:

(a-1) determining whether said AP is present;

(a-2) starting up said AP if said AP is present;

(a-3) determining whether said AP has passed its BIST; and (a-4) selecting said AP as said second processor if said AP has passed its BIST; and wherein said designating step comprises the steps of;

(b-1) setting a first bit to indicate that said second processor is the BSP;

(b-2) clearing a second bit to indicate that said first processor is not the BSP; and (b-3) generating a soft reset.

2. The method of claim 1, wherein said step of determining whether said AP processor is present comprises the steps of:

a) sending a remote read request to said AP; and b) updating said corresponding status flag of said AP if a corresponding presence flag for said AP is set.

3. The method of claim 1, further comprising the step of updating said corresponding status flag to indicate that said AP has failed if it is determined that said AP has failed its BIST.

4. The method of claim 3, further comprising the steps of:

a) loading said memory with default values;

b) setting a reboot flag in said memory; and c) rebooting said computer system.

5. The method of claim 1, wherein said soft reset is an INIT command, and said first bit and said second bit are bootstrap indicator bits for their corresponding processors.

6. The method of claim 1, wherein it is determined that said first processor has failed if said first processor has ever failed a built-in self test (BIST).

7. A computer program embodied on computer readable media for initializing a multiprocessor computer system comprising a plurality of processors and a non-volatile memory for storing a status flag corresponding to each processor, wherein each of the plurality of processors performs a built-in self test (BIST) when it is powered up, wherein a first processor is designated as a bootstrap processor (BSP) after a hard reset and the remaining processors are application processors (APs), and wherein upon doing a hard reset it is determined that said first processor has failed, the computer program comprising the steps of:

a) selecting a second processor from said remaining processors; and b) designating said second processor as said BSP instead of said first processor, wherein said selecting step comprises the following steps, which are performed successively until said second processor is selected for each of said APs that are indicated to be good by their corresponding status flag:

(a-1) determining whether said AP is present;

(a-2) starting up said AP if said AP is present;

(a-3) determining whether said AP has passed its BIST; and (a-4) selecting said AP as said second processor if said AP has passed its BIST; and wherein said designating step comprises the steps of:

(b-1) setting a first bit to indicate that said second processor is the BSP;

(b-2) clearing a second bit to indicate that said first processor is not the BSP; and (b-3) generating a soft reset.

8. The computer program of claim 7, wherein said step of determining whether said AP is present comprises the steps of:

a) sending a remote read request to said AP; and b) updating said corresponding status flag of said AP if a corresponding presence flag for said AP is set.

9. The computer program of claim 7, further comprising the step of: updating said corresponding status flag to indicate that said AP has failed if it is determined that said AP has failed its BIST.

10. The computer program of claim 9, further comprising the steps of:

a) loading said memory with default values;

b) setting a reboot flag in said memory; and c) rebooting said computer system.

11. The computer program of claim 7, wherein said soft reset is an INIT command, and said first bit and said second bit are bootstrap indicator bits for their corresponding processors.

12. The computer program of claim 7, wherein said computer-readable media is a Basic Input/Output System (BIOS) Read Only Memory (ROM).

13. The computer program of claim 7, wherein it is determined that said first processor has failed if said first processor has ever failed a built-in self test (BIST).

14. A multiprocessor computer system comprising:

a plurality of processors, each processor comprising:
an integrated controller and
a processor ID;

a processor bus coupled to each of said processors;

a first memory coupled to said processor bus and programmed with Basic Input/Output System (BIOS) code that comprises an initialization module for initializing the computer system;

a second memory coupled to said processor bus for storing a status flag corresponding to each of said plurality of processors; and a bootstrap processor (BSP) selector coupled to said processor bus that designates a first processor from said plurality of processors as a BSP of the computer system based on said processor ID;

wherein said designated BSP, when executing said initialization module, comprises:

a) a determiner that determines that said first processor has failed;

b) a selector that selects a second of said plurality of processors; and c) a designator that designates said second processor as said BSP instead of said first processor: wherein said designator comprises:
   a bit setter that sets a first bit to indicate that said second processor is the BSP;
   a bit clearer that clears a second bit to indicate that said first processor is not the BSP; and
   a reset generator that generates a soft reset; and
wherein each of the plurality of processors performs a built-in self test (BIST) when it is powered up, and wherein said selector, successively for each remaining processor until said second processor is selected:
   determines whether said processor is present;
   starts up said processor if said processor is present;
   determines whether said processor has passed its BIST; and
   selects said processor as said second processor if said processor has passed its BIST.

15. The multiprocessor computer system of claim 14, wherein said determiner comprises:
   a) a sender that sends a remote read request to said processor; and
   b) an update module that updates said corresponding status flag of said AP if a corresponding presence flag for said AP is set.

16. The multiprocessor computer system of claim 15, wherein said designated BSP, when executing said initialization module, further comprises:
   a) a loader that loads said second memory with default values;
   b) a setter that sets a reboot flag in said second memory; and
   c) a reboot module that reboots said computer system.

* * * * *

UNITED STATES PATENT AND TRADEMARK OFFICE
CERTIFICATE OF CORRECTION

PATENT NO. : 5,790,850
DATED : August 4, 1998
INVENTOR(S) : Mahesh Natu

It is certified that error appears in the above-identified patent and that said Letters Patent is hereby corrected as shown below:

Column 1, line 67, "faulty" should be --fault--.

Signed and Sealed this

Eleventh Day of January, 2000

Attest:

Q. TODD DICKINSON

*Attesting Officer*     *Acting Commissioner of Patents and Trademarks*